(12) United States Patent
Yamaguchi et al.

(10) Patent No.: US 7,686,230 B2
(45) Date of Patent: Mar. 30, 2010

(54) MEDIUM PROVIDED WITH MAGNETIC BODY AND MAGNETIC BODY SENSING DEVICE

(75) Inventors: Shoji Yamaguchi, Kanagawa (JP); Mario Fuse, Kanagawa (JP); Kunihiro Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/066,780

(22) Filed: Feb. 28, 2005

(65) Prior Publication Data

US 2006/0038013 A1 Feb. 23, 2006

(30) Foreign Application Priority Data

Aug. 23, 2004 (JP) ............................. 2004-242516

(51) Int. Cl.
*G06K 19/06* (2006.01)
(52) U.S. Cl. ........................................... 235/493
(58) Field of Classification Search ............... 235/493
See application file for complete search history.

(56) References Cited

U.S. PATENT DOCUMENTS

| 4,253,017 A | * | 2/1981 | Whitehead | ................... 235/449 |
| 4,396,886 A | * | 8/1983 | Koester et al. | ............... 324/212 |
| 4,408,122 A | * | 10/1983 | Casden | ........................ 235/449 |
| 4,455,484 A | * | 6/1984 | Whitehead | ................... 235/493 |
| 5,160,833 A | * | 11/1992 | Nakahara | ..................... 235/449 |
| 5,196,681 A | * | 3/1993 | Mantegazza | ................. 235/449 |
| 6,255,948 B1 | * | 7/2001 | Wolpert et al. | ............ 340/572.8 |
| 6,364,735 B1 | * | 4/2002 | Bristow et al. | .............. 446/397 |
| 6,556,139 B2 | * | 4/2003 | Manov et al. | ............ 340/572.6 |

FOREIGN PATENT DOCUMENTS

| JP | 5-219351 A | 8/1993 |
| JP | 7-133584 A | 5/1995 |
| JP | 9-102083 A | 4/1997 |
| JP | 9-231301 A | 9/1997 |
| JP | 2001-159094 A | 6/2001 |

OTHER PUBLICATIONS

Japanese Office Action dated Nov. 4, 2009 corresponding to Japanese Patent Application No. 2004-242516.

* cited by examiner

*Primary Examiner*—Thien M. Le
*Assistant Examiner*—Tae Kim
(74) *Attorney, Agent, or Firm*—Sughrue Mion, PLLC

(57) ABSTRACT

A medium comprises a magnetic body which generates a signal when a magnetic field is applied thereto, wherein the magnetic body has two or more easy magnetization directions and the magnetic body forms information that identifies the medium based on the signal generated when the magnetic field is applied to the magnetic body.

21 Claims, 10 Drawing Sheets

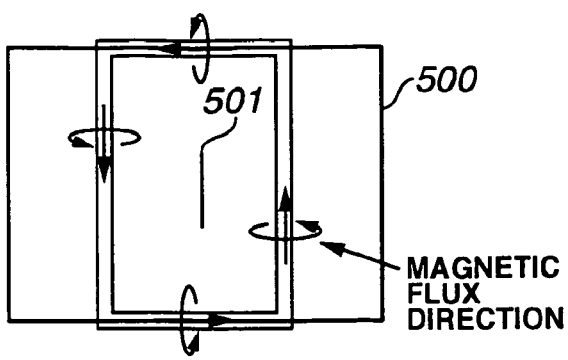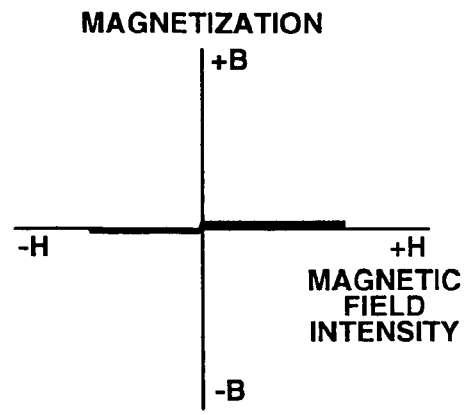
FIG.7A  FIG.7B
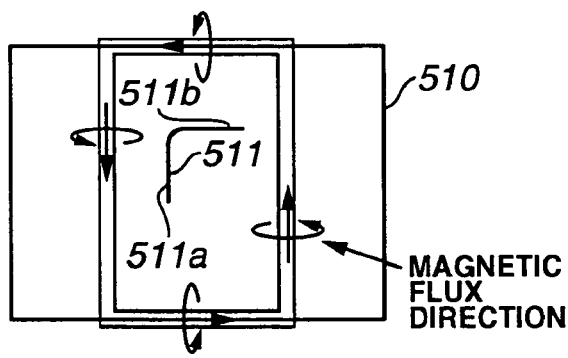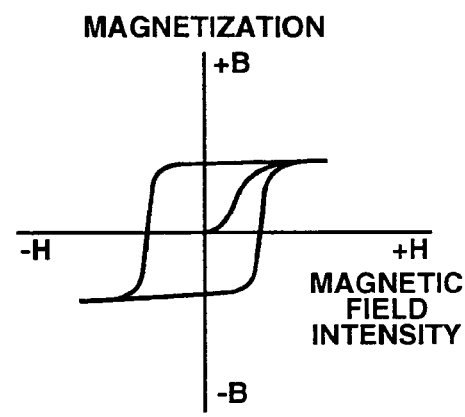
FIG.7C  FIG.7D
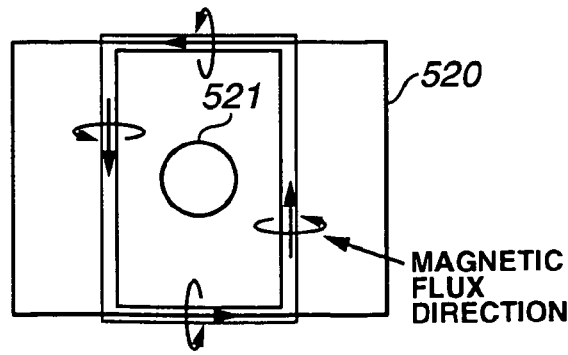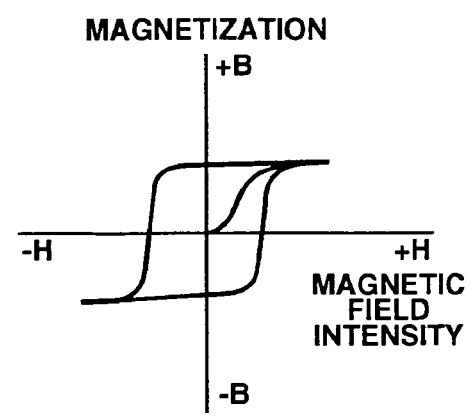
FIG.7E  FIG.7F

MEDIUM PROVIDED WITH MAGNETIC BODY AND MAGNETIC BODY SENSING DEVICE

BACKGROUND OF THE INVENTION

1. Field of the Invention

The present invention relates to a medium provided with a magnetic body and a magnetic body sensing device, and particularly, to a medium provided with a magnetic body and a magnetic body sensing device that senses the medium in a non-contact manner, and prevents erroneous sensing that may occur when the magnetic body sensing device performs sensing of the medium along some directions, thereby to improve the accuracy of sensing.

2. Description of the Related Art

Various methods and devices for enhancing security have been proposed. Such methods and devices are designed to prevent leaks of confidential or personal information, or prevent forgery of securities or the like by unauthorized copying.

For the purpose of preventing forgery of securities or the like, a method has been proposed in which securities or the like are made of a special paper having therein a latent image formed in a specific pattern or formed with special ink containing an infrared absorbing agent, for example.

In this method, when securities made of such a special paper is copied with a scanner (image input device) or copying machine, a latent image of a specific pattern or a latent image drawn with special ink formed in the special paper is printed in a visually observable state. With the printed latent image, the fact that the securities were copied is recognized, thereby enabling to prevent the forgery of securities.

It is known to provide a forgery preventing paper and securities made of such paper, which make it very difficult to forge securities by the use of a color copying machine and to forge the paper itself for the securities. This forgery preventing paper is manufactured by mixing, in a paper base material consisting of pulp fibers, small pieces of paper or fiber fibrils coated with an ink containing a metameric pigment with substantially the same amount of small pieces of paper or fiber fibrils colored with an ordinary color ink which looks the same hue as that of the ink containing the metameric pigment under ordinary light such as sunlight, whereby when a document such as securities made of the forgery preventing paper is copied, two kinds of spots with differing hues appear on the color-copied paper and thus the forgery of securities can be prevented.

It is also known to provide an image processing device and a method of adding a specific pattern when a specific original document is copied. According to this technique, the specific property of an original document is determined by comparing an image from the original document with an image from a transferred material. An output image from the original document with such specific property is always processed before outputting the same, so that if a specific original document (e.g. banknote) that is supposed not to be copied is copied, a clue is provided for locating the copying machine used for the unauthorized copying.

However, the techniques disclosed above require special operations such as scanning image data of an original document, transferred material, or securities. It has therefore been desired a method, device or forgery preventing paper, which, without performing such special operations, is capable of protecting securities against fraudulent copying, or determining whether or not a specific original document.

Further, it is known to provide a robbery preventing label (tag) used in an electronic article surveillance (EAS) system. According to this technique, a robbery preventing label is provided with a soft magnetic thin film used as an active element. The robbery preventing label is designed to be usable in an electronic article inspection system without being affect by orientation of the label at the detector outlet of the system. Specifically, the soft magnetic thin film has an easy magnetization axis in a specific direction, and the robbery preventing label is folded along at least one folding line, so that the robbery preventing label has at least two layers which overlap at least partially with each other, at least one of the folding lines intersects with the direction of the easy magnetization axis to form an oblique angle, and thus the direction of the easy magnetization axis of one of the layers differ from the directions of the easy magnetization axes of other layers.

However, this robbery preventing label is designed such that a response signal from the robbery preventing label can be detected at a predetermine level irrespective of orientations of the magnetic field and the robbery preventing label by differing the direction of the easy magnetization axis of one layer from the directions of the easy magnetization axes of the other layers. Thus, a method of applying this robbery preventing label to a medium to enable unique identification of the medium and sensing and identifying a desired medium from plural media provided with such robbery preventing label is not disclosed.

Further, it is known to provide a magnetic marker that is readable in a non-contact manner and has various information recorded in a magnetic pattern and a method of reading such a magnetic marker. According to this technique, the magnetic marker is provided with a magnetic pattern such that the easy magnetization direction forms a predetermined angle with a scanning direction, and encoding is thus performed with an angle formed between the easy magnetization direction and the scanning direction. As the results, it is made possible not only to read the magnetic marker in a non-contact manner but also to represent analog data or multi-value data by the use of a single bar.

However, this magnetic marker is designed such that encoding is performed by using an angle formed between the easy magnetization direction of the magnetic pattern and a scanning direction. Therefore, if a medium provided with the magnetic marker is placed in an arbitrary orientation, an angle formed between the easy magnetization direction of the magnetic pattern and a scanning direction will vary, even for the same medium, according to the orientation where the medium is placed, and a sensed code will possibly be detected as a different code.

SUMMARY OF THE INVENTION

The present invention has been made in view of the above circumstances and provides a medium provided with a magnetic body and a magnetic body sensing device for sensing in a non-contact manner a medium provided with a magnetic body capable of preventing erroneous sensing caused by a direction along which the magnetic body sensing device senses the medium, thereby to improve the detection accuracy.

In a first aspect of the present invention, a medium comprises a magnetic body which generates a signal when a magnetic field is applied thereto, wherein the magnetic body has two or more easy magnetization directions and the magnetic body forms information that identifies the medium based on the signal generated when the magnetic field is applied to the magnetic body.

In a second aspect of the present invention, a magnetic body sensing device for sensing a medium provided with a magnetic body generating a signal when a magnetic field is applied thereto, comprises a detector that applies a magnetic field to the magnetic body provided to the medium, and detects a signal generated by the magnetic body in response to the magnetic field applied; and a sensor that senses information formed by the magnetic body based on the signal generated by the magnetic body and detected by the detector, wherein the magnetic body has two or more easy magnetization directions.

BRIEF DESCRIPTION OF THE DRAWINGS

Embodiment of the present invention will be described in detail based on the following figures, wherein:

FIGS. 7A to 7F illustrate measurement results of detection output from plural magnetic bodies having different shapes provided to paper when the paper is placed laterally on the platen glass 14 of the copying machine 10;

DESCRIPTION OF THE EMBODIMENTS

Figure 1A:
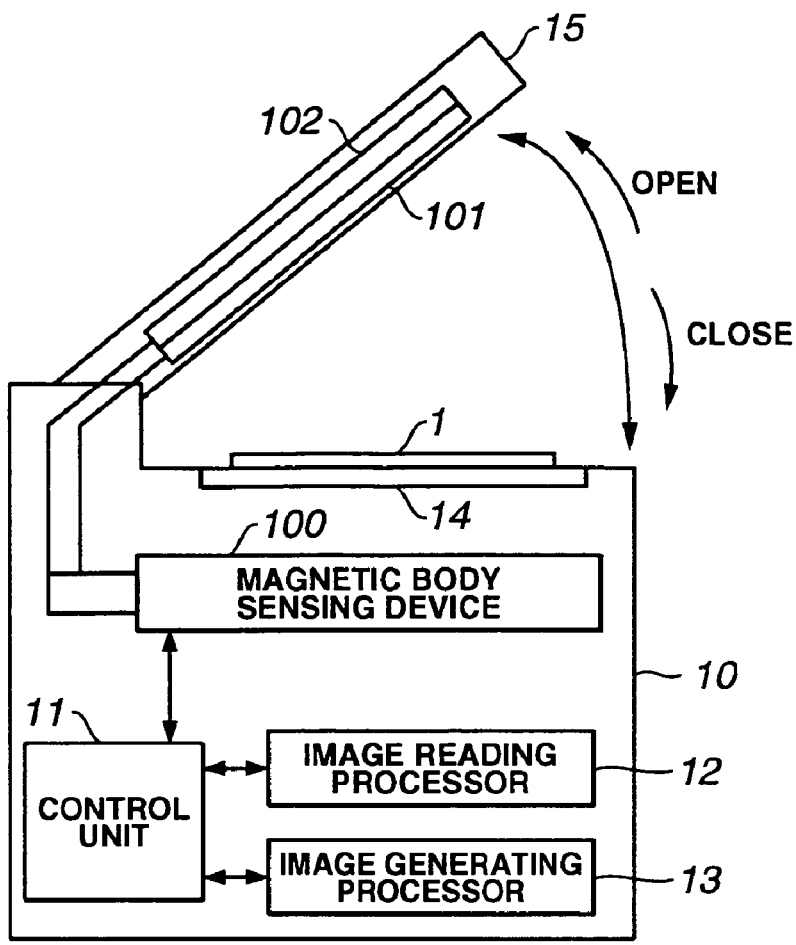
FIGS. 1A and 1B are schematic views of a copying machine 10 equipped with a magnetic body sensing device 100 according to an embodiment of the present invention, FIG. 1A being a block diagram schematically illustrating the copying machine 10 and FIG. 1B being a schematic perspective view of the copying machine 10.

Embodiment of the present invention will be described while referring to the accompanying drawings.

The medium provided with a magnetic body and the magnetic body sensing device according to the present invention are applicable to printing machines, copying machines, robbery preventing devices or the like for the purpose of preventing the leakage of confidential information or personal information, or for the purpose of document management.

The document management is performed by printing confidential information on paper provided with a magnetic body that indicates identification information unique to the paper. When the confidential information printed on the paper is copied in a copying machine that includes the magnetic body sensing device according to the present invention, the magnetic body sensing device senses the magnetic body provided to the paper, and performs control to prohibit the copying operations by the copying machine based on the results of the sensing. When paper on which confidential information is printed is taken out without authorization, the magnetic body sensing device of the present invention provided in a robbery preventing device senses this unauthorized action, and performs prescribed operations such as sounding alarms based on the sensing results, thus preventing the unauthorized action. In the above manners, it is possible to prevent the fraudulent copying or taking out of the confidential information, whereby the leakage of the confidential information can be prevented effectively.

The magnetic body provided to the medium such as paper has a property of being magnetized in a predetermined magnetic field and of generating a steep magnetic pulse when the magnetization is reversed, or a property of generating an electromagnetic wave during magnetostrictive vibrations. Therefore, it is possible to identify information given to the medium by combining plural different type of magnetic bodies having different shapes or sizes, and providing such magnetic bodies to the medium.

Therefore, the medium provided with a magnetic body and the magnetic body sensing device according to the present invention are designed such that a predetermined magnetic field is applied to the magnetic body provided to the medium, a magnetic pulse signal or electromagnetic wave signal generated in the magnetic body is detected, and information of the magnetic body provided to the medium is sensed based on the detection results.

However, the detection signal detected when the magnetic body is reversed in magnetization by being subjected to a predetermined magnetic field, or the detection output of the detection signal detected through magnetostrictive vibrations differs depending on the direction of the magnetic field applied to the magnetic body and the direction of the easy magnetization axis of the magnetic body.

Accordingly, even if a predetermined magnetic field is applied to the medium that is placed in an arbitrary orientation in the magnetic body, the output of a detection signal detected from the magnetic body will differ depending on the direction of the easy magnetization axis of the magnetic body and the direction of the predetermined magnetic field applied to the medium. Depending on the detection output values, the magnetic body may not be sensed at all or may be sensed erroneously.

Therefore, the following detailed description of the preferred embodiments will be made on a case where the magnetic body sensing device of the present invention is applied to a copying machine, which is capable of, when an original document having confidential information printed on paper provided with a magnetic body is attempted to be copied, sensing the magnetic body provided to the original document by means of the magnetic body sensing device, recognizing that the original document is an uncopiable document, and performs control to prohibit the copying operations.

A detailed description of an embodiment of the present invention will now be made with reference to the attached drawings on an example where a medium provided with a magnetic body and a magnetic body sensing device according to the embodiment are applied to a copying machine.

Figure 1B:
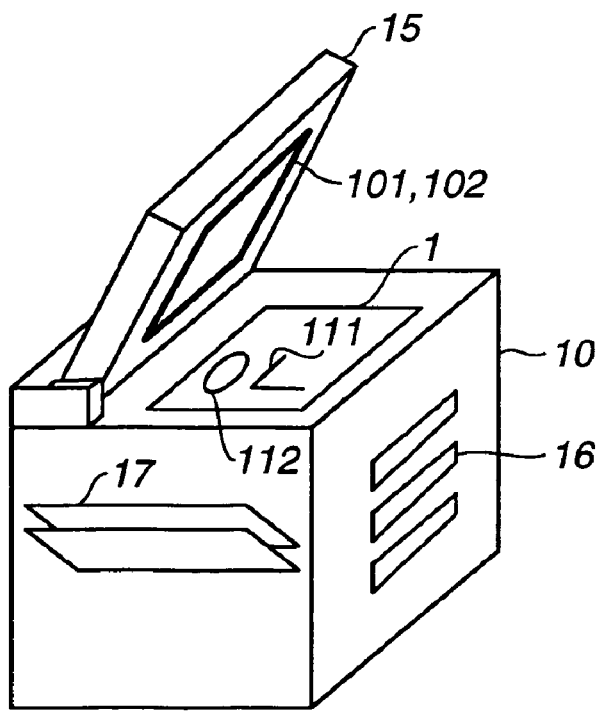

FIGS. 1A and 1B are schematic views of a copying machine 10 equipped with a magnetic body sensing device 100 according to the embodiment, in which FIG. 1A is a block diagram schematically illustrating the copying machine 10 and FIG. 1B is a schematic perspective view of the copying machine 10.

Referring to FIGS. 1A and 1B, the copying machine 10 includes a magnetic body sensing device 100 which senses magnetic bodies 111 and 112 provided to an original document 1 placed on a platen glass 14 of the copying machine 10, and outputs a signal indicating the sensing results; a control unit 11 which controls the entirety of the copying machine 10, and either controls to prohibit the copying machine 10 from copying the original document 1 or controls the copying operations depending on the sensing results of the magnetic body sensing device 100; an image reading processor 12 which illuminates the original document 1 placed on the platen glass 14, receives reflected light from the original document 1 and converts the received reflected light into an electric signal by means of a photoelectric conversion element (not shown) such as a charge coupling device (CCD), and reads image data recorded on the original document 1 based on the electric signal converted by the photoelectric conversion element; and an image generating processor 13 which prints the image data read by the image reading processor 12 on copying paper (not shown) fed from a paper tray 16 and discharges the paper onto a paper exit tray 17.

An exciting coil 101 and a sensing coil 102 of the magnetic body sensing device 100 are arranged on the rear face of a platen cover 15 of the copying machine 10 for sensing the magnetic bodies 111 and 112 provided to the original document 1 placed on the platen glass 14. The exciting coil 101 generates a predetermined alternate magnetic field, and the sensing coil 102 receives magnetic pulses or electromagnetic waves generated from the magnetic bodies 111 and 112 as well as the alternate magnetic field.

A brief description will now be made on the operations of the copying machine 10, which determines whether an original document 1 placed on the platen glass 14 in an arbitrary orientation is copiable or not, and performs either processing for copying or processing for prohibiting the copying in accordance with the results of the determination.

When an original document 1 is placed on the platen glass 14 of the copying machine 10, the platen cover 15 is closed (in the direction indicated by the arrow in FIG. 1A), and a copy start button (not shown) is pressed, the control unit 11 of the copying machine 10 activates the magnetic body sensing device 100 before starting the operations of copying the original document 1.

Upon activation of the magnetic body sensing device 100, a predetermined alternate magnetic field is generated from the exciting coil 101, and the magnetic bodies 111 and 112 provided to the original document 1 on the platen glass 14 are magnetized, receiving the alternate magnetic field. As a result, the magnetic bodies are caused to generate a steep magnetic pulse due to the magnetization reversal thereof or an electromagnetic wave due to magnetostrictive vibrations thereof.

The magnetic pulse or electromagnetic wave generated by the magnetic bodies is received by the sensing coil 102 and sensed by the magnetic body sensing device 100.

Based on the sensing results of the magnetic bodies 111 and 112 in the original document 1 by the magnetic body sensing device 100, the control unit 11 of the copying machine 10 determines whether the original document 1 provided with the magnetic bodies 111 and 112 is a copiable document or not. If it is determined that the original document 1 is an uncopiable document, then the control unit 11 outputs a message indicating prohibition of copying, such as "This document cannot be copied", or outputs an alarm sound, and at the same time performs control to prohibit the copying operation.

If it is determined that the original document 1 is a copiable document, image data of the original document 1 placed on the platen glass 14 is read by the image reading processor 12, the image data of the original document 1 thus read is printed on copying paper fed from the paper tray 16, and the printed paper is discharged onto the paper exit tray 17.

In this manner, before performing the copying operations on the original document 1 placed on the platen glass 14, the copying machine 10 determines whether the original document 1 is a copiable document or not, and if it is determined that the original document 1 is an uncopiable document, the copying machine 10 performs control to prohibit the copying operation. Therefore, it is possible to prevent an uncopiable original document from being copied by mistake or fraudulently. It is also possible to save the power consumption of the copying machine 10 by suppressing unnecessary copying operations.

The timing for the magnetic body sensing device 100 to determine whether copying operations of the original document 1 should be performed is not fixedly determined, and may be the time at after the original document 1 is placed on the platen glass 14, or before or after the copying machine 10 is instructed to start copying.

The magnetic bodies 111 and 112 provided to the original document 1 as shown in FIG. 1 are an example of many possible ways of embodying the magnetic bodies. The number and the shape of the magnetic bodies 111 and 112 are not determined particularly. Therefore, only one magnetic body may be provided to the original document 1, or plural magnetic bodies of plurality of shapes may be provided thereto.

Figure 2:
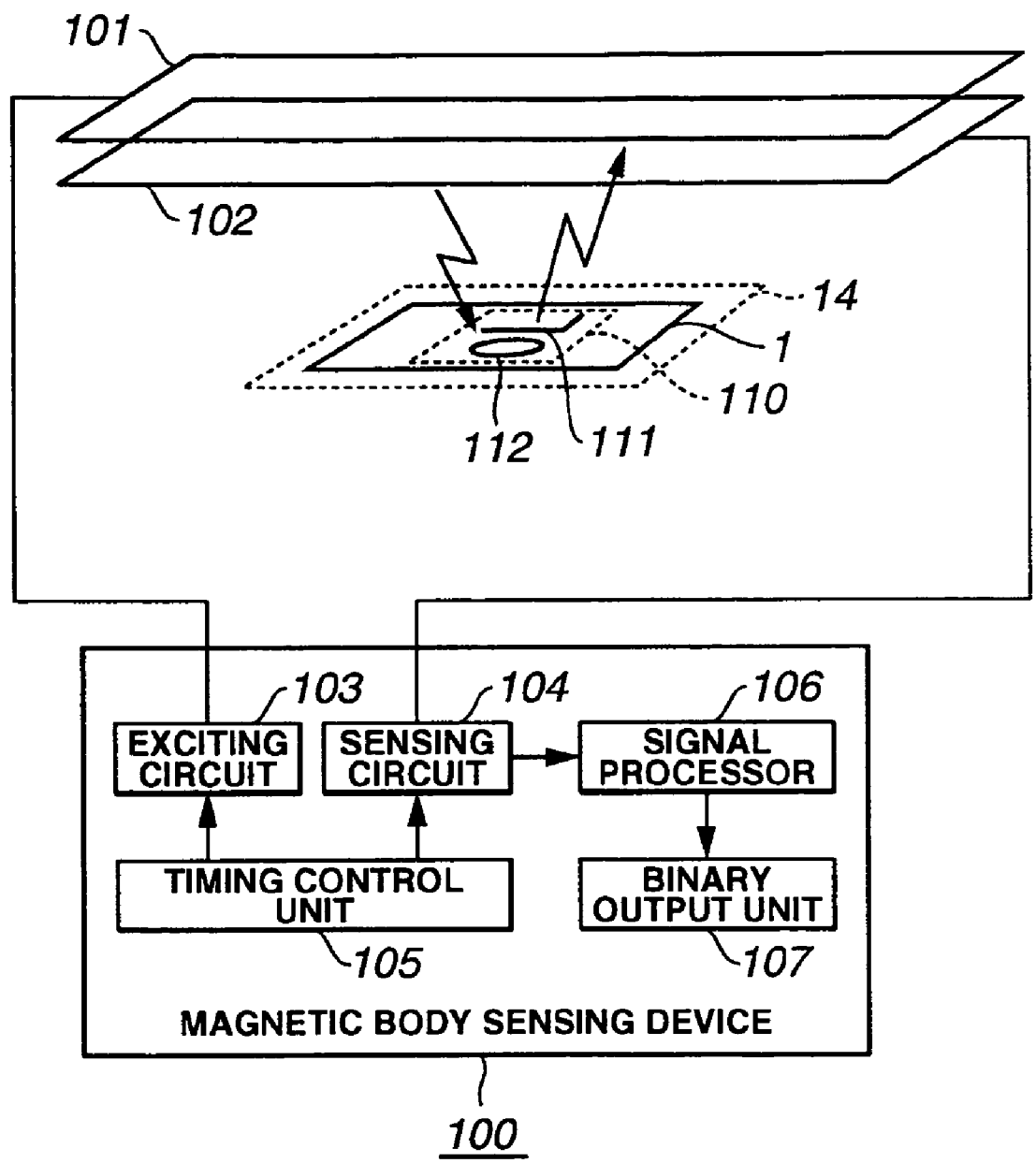
FIG. 2 is a block diagram illustrating configuration of a principal part of the magnetic body sensing device 100 according to the embodiment.

FIG. 2 is a block diagram illustrating a principal part of the magnetic body sensing device 100 according to the embodiment.

Referring to FIG. 2, the magnetic body sensing device 100 includes an exciting circuit 103, a sensing circuit 104, a signal processor 106, a binary output unit 107 and a timing control unit 105. The exciting circuit 103 performs control to cause the exciting coil 101 to generate a predetermined alternate magnetic field. The sensing circuit 104 detects, by means of the sensing coil 102, a steep magnetic pulse which is generated by plural magnetic bodies 111 and 112 provided to the original document 1 in association with identification information 110 unique to the original document 1 and formed in the original document 1 (the area of the original document 1 indicated by the broken line in FIG. 2), when the magnetic bodies 111 and 112 are magnetized by the original document 1 receiving the predetermined alternate magnetic field generated by the exciting coil 101 and the magnetization of the magnetized magnetic bodies are reversed. The signal processor 106 processes a detection signal corresponding to the alternate magnetic field or a magnetic pulse generated by the magnetic bodies detected by the sensing circuit 104 and stored in a memory unit (not shown). The binary output unit 107 outputs the identification information 110 of the original document 1 in binary digits based on the information signal-processed by the signal processor 106. The timing control unit 105 performs timing-controlling of the exciting circuit 103 and the sensing circuit 104 so as to enable the sensing circuit 104 to sense the alternate magnetic field or magnetic pulse at a timing corresponding to the cycle of the alternate magnetic field.

In the magnetic body sensing device 100 thus constructed, the exciting circuit 103 supplies current having a frequency of 1 kHz to the exciting coil 101, for example, whereby an alternate magnetic field is generated at a frequency of 1 kHz in a predetermined space corresponding to the shape of the exciting coil 101.

The timing control unit 105 detects the time when a current value of the current with the frequency of 1 kHz generated by the exciting circuit 103 becomes zero in the rising direction, in other words when the direction of the current is reversed from negative to positive, and outputs a reference signal to the sensing circuit 104 at this detected time at a timing of once per cycle of the alternate magnetic field.

The sensing circuit 104 receives the detection signal detected by the sensing coil 102 based on the timing of the reference signal output by the timing control unit 105, and stores the detection signal in the memory of a storage device (not shown).

The signal processor 106 detects a pulse signal corresponding to the magnetic pulses generated at the magnetization reversal of the magnetic bodies, for example, by removing the alternate magnetic field component from the detection signal stored in the memory, amplifying a positive signal component of the signal from which the alternate magnetic field component has been removed, and removing noise components.

The detection pulse signal detected by the signal processor 106 is output to the binary output unit 107. The binary output unit 107 converts the detection pulse signal into identification information represented by a binary digit of '1' or '0' and outputs the identification information to the control unit 11 of the copying machine 10 as identification information assigned to the original document 1.

As described above, the magnetic body sensing device 100 applies an alternate magnetic field to plural magnetic bodies associated with the identification information formed on the original document 1, detects the magnetic pulse generated by the magnetization reversal of the magnetic bodies, senses the identification information assigned to the original document 1 based on the detected detection pulse signal pattern, and outputs the sensing results.

Figure 3A:
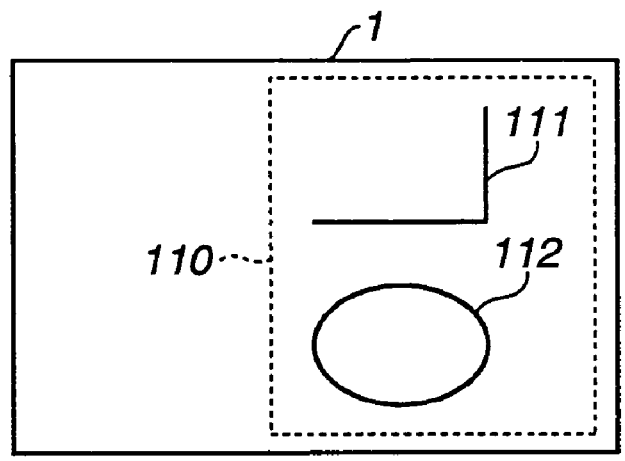
FIG. 3A illustrates magnetic bodies 111 and 112 associated with identification information 110 provided to an original document 1 and an example of shapes of the magnetic bodies.
Figure 3B:
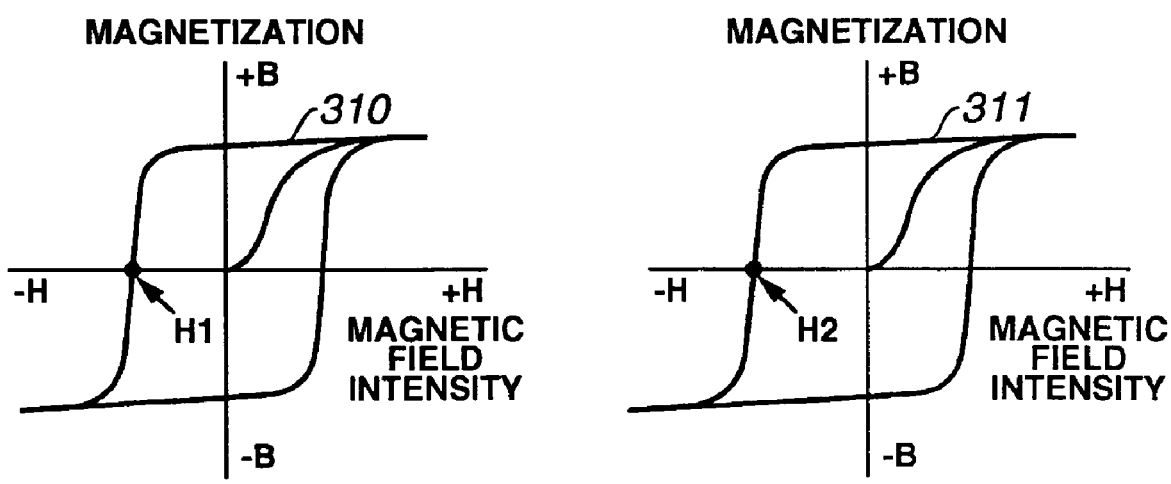
FIG. 3B illustrates magnetic properties of the magnetic bodies 111 and 112.
Figure 4:
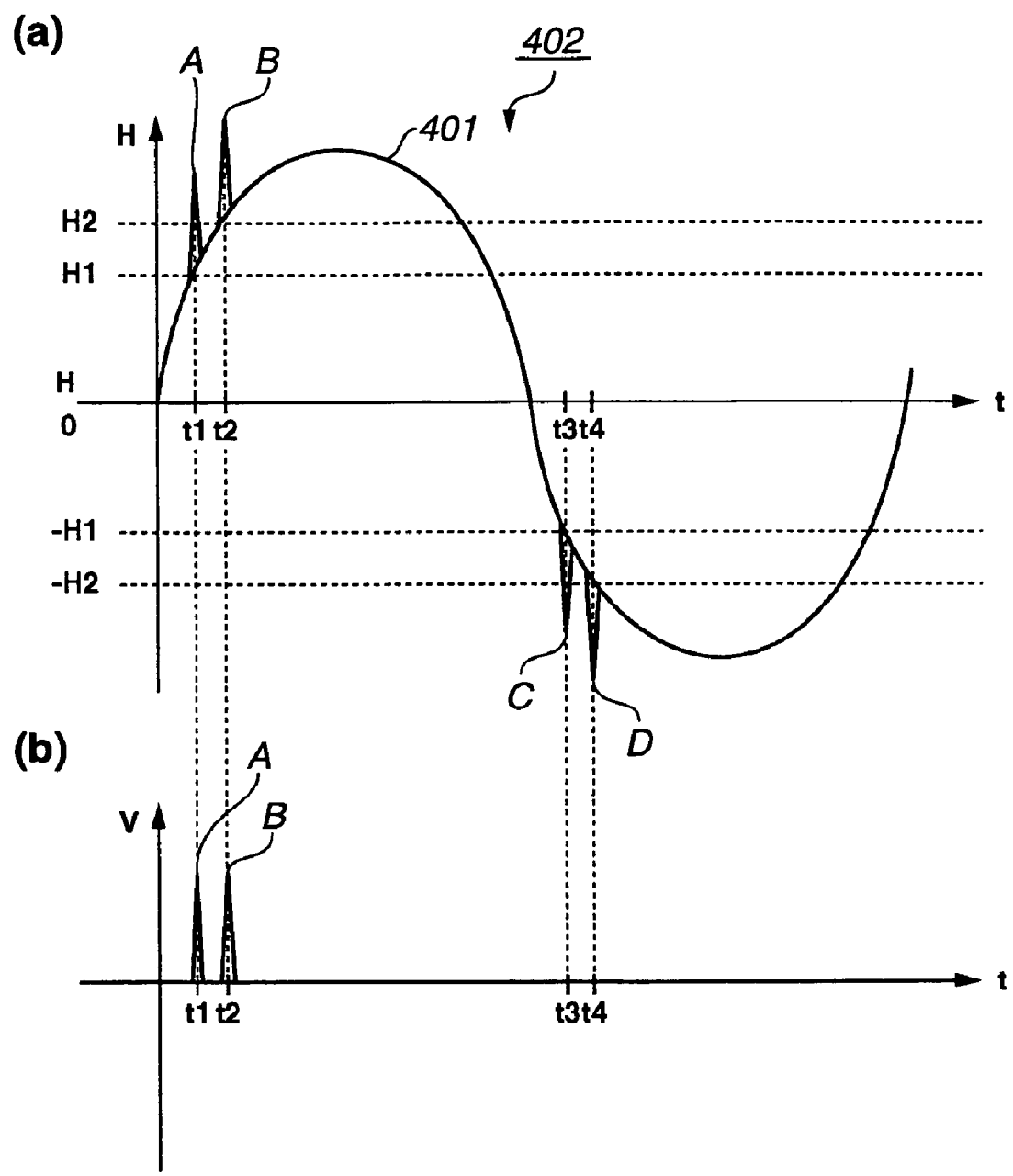
FIG. 4 illustrates the detection signal waveform in portion (a) and detection pulse signal waveform of the magnetic bodies 111 and 112 provided to the original document 1 in portion (b)

Referring to FIGS. 3A, 3B and 4, a description will now be made on an original document 1 provided with magnetic bodies detected by the magnetic body sensing device 100 constructed in this manner, and magnetic bodies provided to the original document 1.

FIG. 3A illustrates an example of magnetic bodies 111 and 112 provided to an original document 1 in association with identification information 110 assigned to the original document 1 and shapes of the magnetic bodies, and FIG. 3B illustrates magnetic properties of the magnetic bodies 111 and 112, respectively.

Portion (a) of FIG. 4 illustrates a detection signal waveform of a predetermined alternate magnetic field and a magnetic pulse generated by the magnetic bodies 111 and 112 detected by the sensing circuit 104 of the magnetic body sensing device 100, and portion (b) of FIG. 4 illustrates a detection pulse signal waveform detected by the signal processor 106 from the detection signal waveform detected by the sensing circuit 104.

As mentioned in the above, a single magnetic body may be provided to the original document 1, or plural magnetic bodies of plural shapes may be provided in combination. For the convenience of description, an L-shaped magnetic body 111 and a circular-shaped magnetic body 112 are shown in FIG. 3.

A detailed description will be given later on the properties of the magnetic bodies for each of the shapes.

Referring to FIG. 3A, the magnetic bodies 111 and 112 provided to the original document 1 are formed of a magnetic wire of Fe—Co amorphous alloy. The magnetic body 111 of a magnetic wire is formed into an L-shape and the magnetic body 112 of a magnetic wire is formed into a circular shape, and they are provided to the original document 1.

The magnetic wire has an easy magnetization axis in the lengthwise direction thereof.

Referring to FIG. 3B, the magnetic bodies 111 and 112 provided to the original document 1 have magnetic properties as represented by magnetic hysteresis curves 310 and 311, respectively. The magnetic body 111 has a coercive force H1, for example, as shown by the magnetic hysteresis curve 310, and the magnetic body 112 has a coercive force H2, for example, as shown by the magnetic hysteresis curve 311.

The magnetic body 111 having the coercive force H1 is reversed in magnetization upon receiving an alternate magnetic field with intensity higher than H1, and generates a steep magnetic pulse at the same time. The magnetic body 112 having the coercive force H2 is reversed in magnetization upon receiving an alternate magnetic field with intensity higher than H2, and generates a steep magnetic pulse at the same time.

The intrinsic coercive forces H1 and H2 of the magnetic bodies 111 and 112 differ depending on the sizes and/or shapes of the magnetic bodies. For example, as shown by the detection signal waveform 402 in FIG. 4A, the magnetic body 111 having the coercive force H1 is reversed in magnetization upon receiving an alternate magnetic field whose magnetic field intensity has become substantially H1 at the time t1 defined by the reference signal output from the timing control unit 105, and generates a steep magnetic pulse A at the same time. The magnetic body 111 is reversed in magnetization again upon receiving an alternate magnetic field whose magnetic field intensity has become substantially −H1 at the time t3, and generates a steep magnetic pulse C at the same time.

The magnetic body 112 having the coercive force H2 is reversed in magnetization upon receiving an alternate magnetic field whose magnetic field intensity has become substantially H2 at the time t2, and generates a steep magnetic pulse B at the same time. The magnetic body 112 is reversed in magnetization again upon receiving an alternate magnetic field whose magnetic field intensity has become substantially −H2 at the time t4, and generates a steep magnetic pulse D at the same time.

The detection signal waveform 402 detected by the sensing circuit 104 of the magnetic body sensing device 100 is output to the signal processor 106, where the signal waveform 401 corresponding to the alternate magnetic field component is removed from the detection signal waveform 402. The pulse signals A and B which are positive signal components are detected from among the pulse signals A, B, C, and D, and are further amplified. After removing the noise component from the pulse signals A and B, detection pulse signals A and B as shown in FIG. 4B are detected.

The detection pulse signals A and B detected by the signal processor 106 are output to the binary output unit 107. The binary output unit 107 converts the detection pulse signals A and B into identification information associated with binary information based on the pattern of the detection pulse signal detected in the detection pulse signals A and B.

Specifically, for example, the detection times t1 and t2 of two detection pulse signals corresponding to magnetic pulses generated by the magnetic bodies 111 and 112 are associated with information on whether a detection pulse signal is detected or not. Information on whether a detection pulse signal is detected or not at the detection time t1 is associated as first bit information, and information on whether a detection pulse signal is detected or not at the detection time t2 is associated as second bit information, so that identification information is output as two-binary information.

More specifically, the binary output unit 107 determines whether or not a detection pulse signal is detected at the detection time t1 and t2 based on the patterns of the detection pulse signals A and B detected from the original document 1, respectively. If it is determined that the detection pulse signal A is detected at the detection time t1, the first bit information associated with the detection time t1 is set to '1', and if it is determined that the detection pulse signal B is detected at the detection time t2, the second bit information associated with the detection time t2 is set to '1', whereby binary information of '11' is output as identification information assigned to the original document 1.

The method as described above in which the binary output unit 107 outputs the identification information assigned to the original document 1 as binary information based on the detection pulse signals is to be taken as an example and the present invention is not limited to this method.

For example, identification information may be associated with numbers of detection pulse signals detected. Further, the detection pulse signal may be output as a detection pulse signal without being converted into binary information, or may be output as information corresponding to the detection pulse signal.

As described above, by applying a predetermined alternate magnetic field to the magnetic bodies 111 and 112 provided to the original document 1, a steep pulse signal generated upon the magnetization reversal caused thereby is detected, the presence of the magnetic bodies 111 and 112 provided to the original document 1 is detected based on this detection results, and identification information of the original document 1 associated with the detection results of the magnetic bodies 111 and 112 is sensed.

The control unit 11 of the copying machine 10 determines whether the original document 1 is a copiable document or not, on the basis of the identification information of the original document 1 output from the magnetic body sensing device 100 or on the sensing results. If it is determined that the original document 1 is an uncopiable document, then the control unit 11 performs control to prohibit the copying operations of the copying machine 10.

Although, according to the embodiment described above, it is determined whether an original document 1 is a copiable document or an uncopiable document based on identification information or sensing results of the original document 1, it may also be determined by the control unit 11 based on a management table in which identification information or sensing results stored in a database (not shown) based on identification information or sensing results of the original document 1 are associated with information enabling the copying and information disabling the copying. It is also possible that the magnetic body sensing device 100 outputs information enabling or disabling the copying based on the identification information or sensing results.

The magnetic body sensing device 100 also may be designed to recognize that the original document 1 is an uncopiable document upon sensing a magnetic body in the original document 1 and to perform control for prohibiting the copying operation.

As described above, the magnetic body sensing device 100 according to the embodiment is designed such that a magnetic body having such property as generating a steep magnetic pulse upon magnetization reversal, namely property of so-called Barkhausen effect is provided to a medium, a predetermined magnetic field is applied to the medium to cause magnetization reversal of the magnetic body provided to the medium, a magnetic pulse generated by the magnetization reversal is detected, and the detection signal thus obtained is used to sense identification information assigned to the medium or information on whether a magnetic body is present in the medium or not.

However, when magnetic bodies with various shapes associated with identification information are provided to an original document, the original document is placed on the platen glass 14 of the copying machine 10 in an arbitrary orientation, and the magnetic bodies with various shapes provided to the original document are detected by using the magnetic body sensing device 100, it is found that the detection output of a pulse signal generated by magnetization reversal of a detected magnetic body differs in accordance with the relationship between the direction of the magnetic field generated by the exciting coil 101 of the magnetic body sensing device 100 and the direction of the easy magnetization axis of the magnetic body provided to the original document placed on the platen glass 14. There is even a possibility that, for certain values of the detection output, the magnetic body provided to the original document is not detected at all or is erroneously detected.

Therefore, for the purpose of comparing detection outputs of detection signals detected when magnetic bodies are reversed in magnetization upon receiving a predetermined magnetic field, the inventors of the present application conducted measurements as shown in FIGS. 5 to 7 by providing paper with plural magnetic bodies with different shapes and associating the easy magnetization direction axis of each magnetic body provided to the paper with the direction of the predetermined magnetic field applied to the magnetic body.

The measurements were performed on the detection outputs of an I-shaped magnetic wire having one easy magnetization axis, and L-shaped and circular-shaped magnetic wire having two or more easy magnetization directions.

Specifically, referring to FIGS. 5 to 7, an I-shaped magnetic wire 501 was prepared by forming a magnetic wire having an easy magnetization axis along the lengthwise direction of the wire into a linear shape with a predetermined length, an L-shaped magnetic wire 511 was prepared by forming the wire into an L-shape, and a circular-shaped magnetic wire 521 was prepared by forming the wire into a circular shape. The I-shaped magnetic wire 501, L-shaped magnetic wire 511 and circular-shaped magnetic wire 521 were provided to A4 size paper 500, 510 and 520, respectively. The paper 500, 510 and 520 were placed on the platen glass 14 of the copying machine 10 longitudinally (FIGS. 5A, 5B, and 5C), obliquely (FIGS. 6A, 6B, and 6C), and transversely (FIGS. 7A, 7B, and 7C), and the detection outputs of the magnetic pulse generated upon the magnetization reversal of the magnetic wires 501, 511 and 521 detected by the magnetic body sensing device 100 were measured.

Figure 5A:
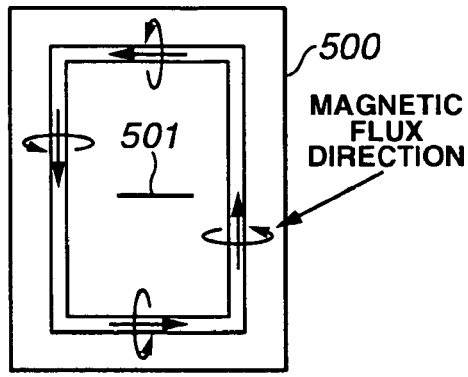
FIGS. 5A to 5F illustrate measurement results of detection output from plural magnetic bodies having different shapes provided to paper when the paper is placed longitudinally on a platen glass 14 of the copying machine 10.
Figure 5B:
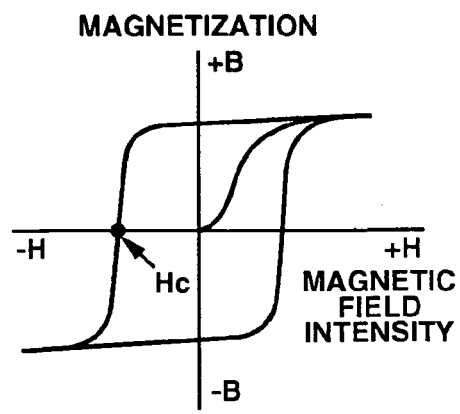

Referring to FIGS. 5A through 5F, the paper 500, 510 and 520 provided with the magnetic wires 501, 511 and 521 were placed longitudinally on the platen glass 14 of the copying machine 10 and the detection output at the time of magnetization reversal of the magnetic wires 501, 511 and 521 were measured. Referring to FIG. 5A, the magnetic flux direction of the magnetic field generated by the exciting coil 101 of the magnetic body sensing device 100 was in parallel with the easy magnetization axis of the I-shaped magnetic wire 501 provided to the paper 500. Referring to FIG. 5B, the measurement results of the I-shaped magnetic wire 501 were obtained in which the coercive force (Hc) was about 1 oersted and the magnetic flux-voltage (sensing output), which was sensible, is about 3 mV.

Figure 5C:
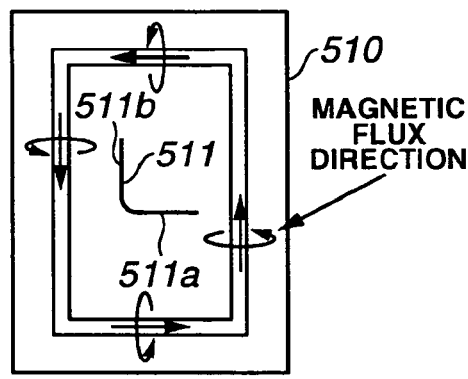
Figure 5D:
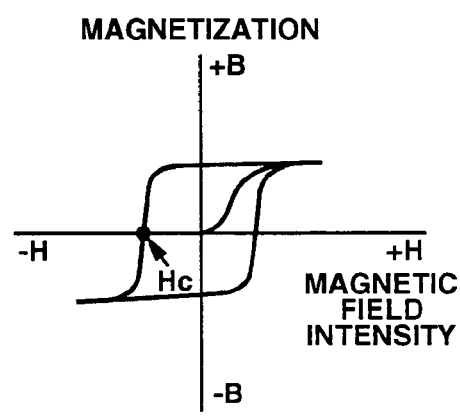

Referring to FIG. 5C, the magnetic flux direction of the magnetic field generated by the exciting coil 101 of the magnetic body sensing device 100 was in parallel with the easy magnetization axis of a part 511a of the L-shaped magnetic wire 511 provided to the paper 510, while the easy magnetization axis of another part 511b of the L-shaped magnetic wire 511 was vertical to the magnetic flux direction. Referring to FIG. 5D, the measurement results of the L-shaped magnetic wire 511 were obtained in which the coercive force (Hc) was about 0.1 oersteds and the magnetic flux-voltage (sensing output), which was sensible, is about 2 mV.

Figure 5E:
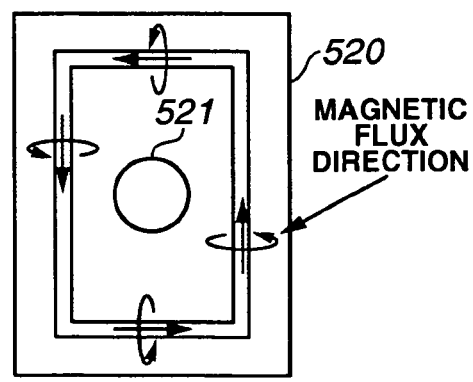
Figure 5F:
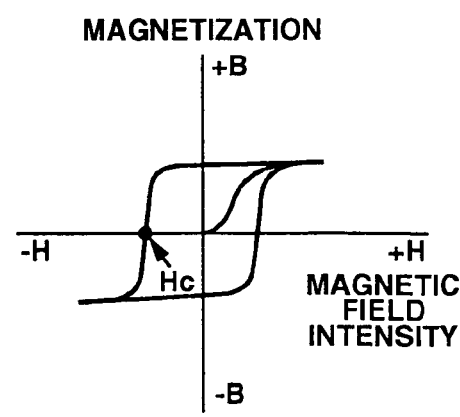

Further, as shown in FIG. 5E, the magnetic flux direction of the magnetic field generated by the exciting coil 101 of the magnetic body sensing device 100 was vertical to the easy magnetization axis in the tangential direction of a part 521a of the circular-shaped magnetic wire 521 provided to the paper 520, while the easy magnetization axis of another part of the circular-shaped magnetic wire 521 was in parallel with the magnetic flux direction. Referring to FIG. 5F, the measurement results of the circular-shaped magnetic wire 521 were obtained in which the coercive force (Hc) was about 0.1 oersteds and the magnetic flux-voltage (sensing output), which was sensible, is about 2 mV.

Figure 6A:
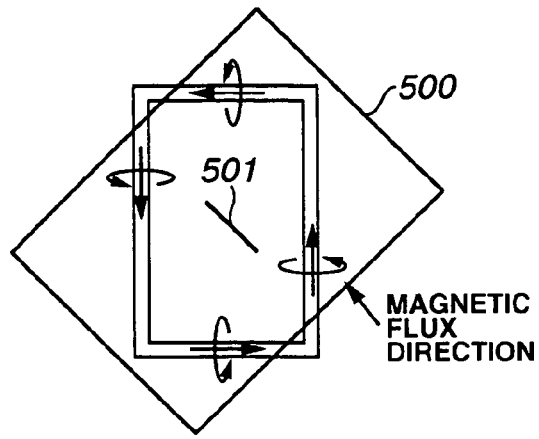
FIGS. 6A to 6F illustrate measurement results of detection output from plural magnetic bodies having different shapes provided to paper when the paper is placed obliquely on the platen glass 14 of the copying machine 10.
Figure 6B:
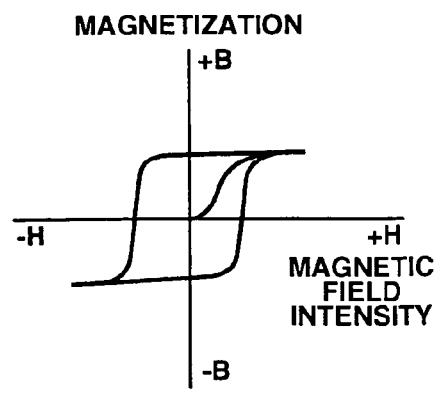
Figure 6C:
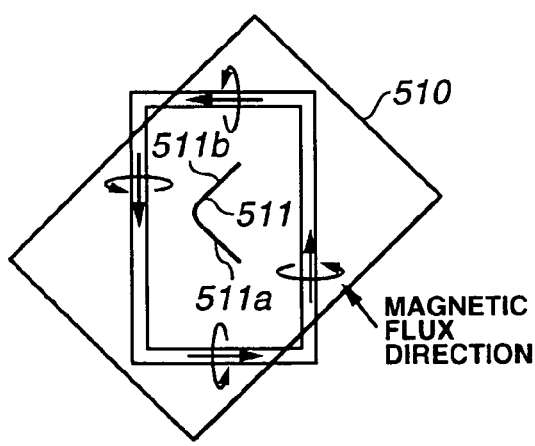
Figure 6D:
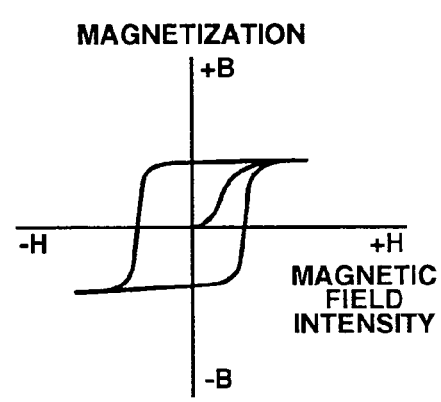
Figure 6E:
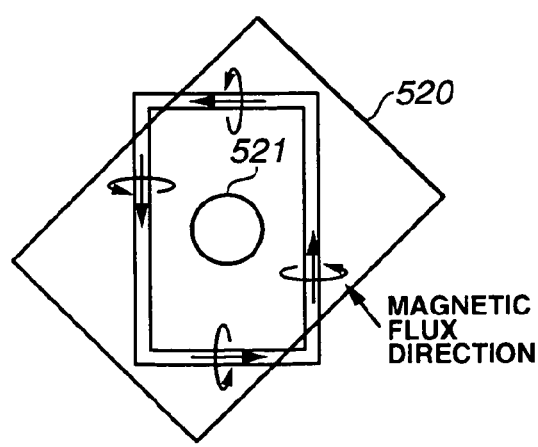
Figure 6F:
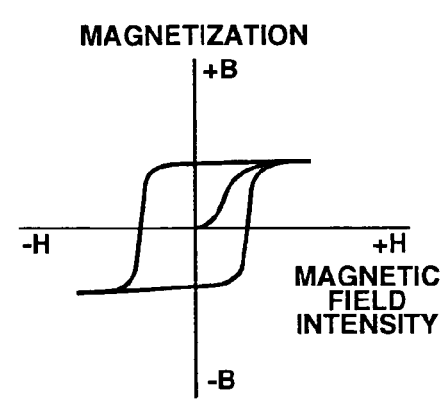
Figure 8A:
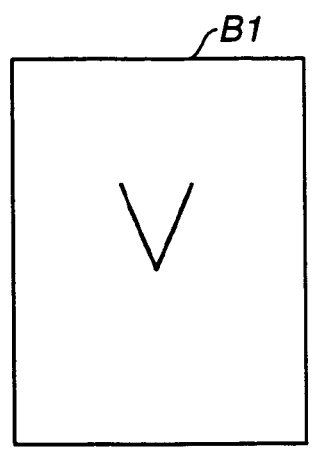
FIGS. 8A to 8F illustrate examples of magnetic bodies having shapes other than the L-shape or circular shape.
Figure 8B:
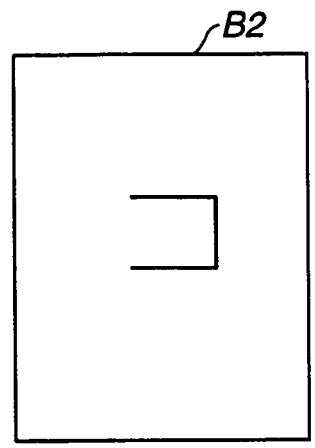
Figure 8C:
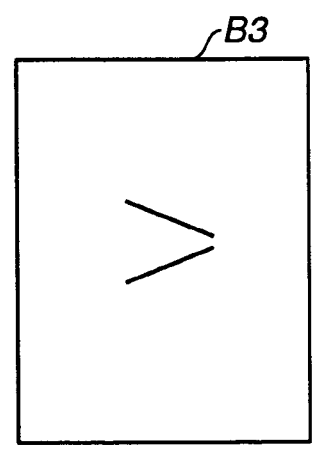
Figure 8D:
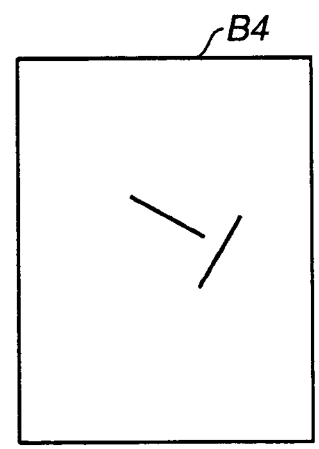
Figure 8E:
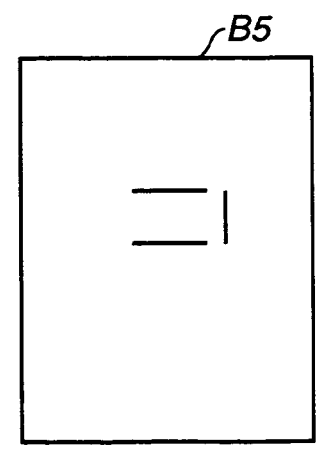
Figure 8F:
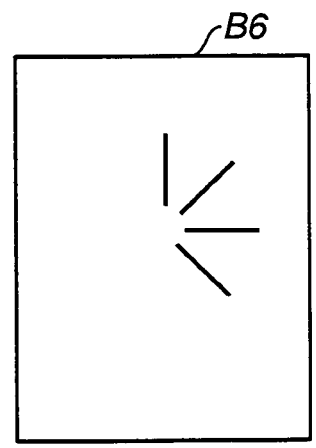

Referring to FIGS. 6A through 6F, the paper 500, 510 and 520 shown in FIG. 5 were placed obliquely on the platen glass 14 of the copying machine 10, and the detection outputs at the time of magnetization reversal of the magnetic wires 501, 511 and 521 sensed by the magnetic body sensing device 100 were measured. Referring to FIG. 6A, the magnetic flux direction of the magnetic field and the direction of the easy magnetization axis of the I-shaped magnetic wire 501 provided to the paper 500 formed a certain angle with respect to the magnetic flux direction of the magnetic field. The detection output of the I-shaped magnetic wire 501 upon magnetization reversal exhibited a decrease in the magnetic flux-voltage compared to the case when the paper was placed longitudinally as shown in FIG. 5A, but the magnetic flux-voltage, which was sensible, is about 2 mV.

Further, the measurement results of the L-shaped magnetic wire 511 and circular-shaped magnetic wire 521 provided to the paper 510 and 520, respectively, were obtained in which they had a coercive force (Hc) of about 0.1 oersteds and a sensible magnetic flux-voltage (sensing output) of about 2 mV, similarly to the case when the paper were placed longitudinally as shown in FIGS. 5B and 5C.

Referring to FIGS. 7A through 7F, the paper 500, 510 and 520 as shown in FIG. 5 were placed transversely on the platen glass 14 of the copying machine 10, and the detection outputs at the time of magnetization reversal of the magnetic wires 501, 511 and 521 sensed by the magnetic body sensing device 100 were measured. Referring to FIG. 7A, the magnetic flux direction of the magnetic field was vertical to the direction of the easy magnetization axis of the I-shaped magnetic wire 501 provided to the paper 500, and the magnetic property of the I-shaped magnetic wire 501 were substantially flat as shown in FIG. 7B. The detection output upon magnetization reversal of the I-shaped magnetic wire 501 was found to be a value difficult to sense.

For the L-shaped magnetic wire 511 provided to the paper 510, similarly to the case when the paper was placed longitudinally as described above with reference to FIG. 5B, the direction of the easy magnetization axis of a part 511b of the L-shaped magnetic wire 511 was parallel with the magnetic flux direction of the magnetic field, while the direction of the easy magnetization axis of another part 511a is vertical to the magnetic flux direction of the magnetic field. Referring to FIG. 7D, the coercive force (Hc) of the L-shaped magnetic wire 511 was about 0.1 oersteds and the magnetic flux-voltage (sensing output), which was sensible, is about 2 mV.

For the circular-shaped magnetic wire 521 provided to the paper 520, similarly to the case when the paper was placed longitudinally as described above with reference to FIG. 5C, the direction of the easy magnetization axis of a part of the circular-shaped magnetic wire 521 in the tangential direction was vertical to the magnetic flux direction of the magnetic field, while the direction of the easy magnetization axis of another part was parallel with the magnetic flux direction of the magnetic field. Referring to FIG. 7F, the coercive force (Hc) of the circular-shaped magnetic wire 521 was about 0.1 oersteds and the magnetic flux-voltage (sensing output), which was sensible, is about 2 mV.

As seen from the measurements results described above, the I-shaped magnetic wire 501 exhibits a large difference in magnetic flux-voltage depending on the orientation of placing the paper on the platen glass 14. Whereas, the L-shaped and circular-shaped magnetic wires 511 and 521 exhibit almost no change in magnetic flux-voltage even if the orientation of placing the paper is changed. Consequently, a sensible detection signal can be constantly obtained, irrelevant to the orientation of placing a paper, and erroneous detection can be prevented.

Although the magnetic wires with an L-shape and a circular shape and their effects have been described in relation to the present embodiment, the present invention is not limited to these shapes. A magnetic body with various other shapes may be used as long as the detection output of a magnetic pulse generated by magnetization reversal of the magnetic body is obtained within a range sensible by the magnetic body sensing device, based on the relationship between the direction of the magnetic field applied to the magnetic body and the direction of the easy magnetization axis of the magnetic body. Further, the exciting coil and the sensing coil of the magnetic body sensing device also may be arranged at any desired position and in any orientation.

FIG. 8 illustrates other examples of paper provided with magnetic bodies having other shapes than the L-shape and circular shape described above. FIG. 8A illustrates a paper 81 provided with a single magnetic wire formed into a V-shape. FIG. 8B illustrates a paper 82 provided with a single magnetic wire formed into a U-shape. FIG. 8C illustrates a paper 83 provided with two magnetic wires arranged in a V-shape forming an angle smaller than 90 degrees. FIG. 8D illustrates a paper 84 provided with two magnetic wires arranged into a V-shape forming an angle larger than 90 degrees. FIG. 8E illustrates a paper 85 provided with three magnetic wires formed into a U-shape. FIG. 8F illustrates a paper 86 provided with three magnetic wires formed into plural V-shapes.

When the paper 81 to 86 are provided with magnetic bodies having the shapes as shown in FIGS. 8A to 8F instead of the L-Shaped and circular-shaped magnetic bodies described above, it is possible to obtain a detection output of the detection signal generated by magnetization reversal of the magnetic bodies as a detection output sensible by the magnetic body sensing device by applying a predetermined magnetic field irrespective to the orientations where these paper are placed on the platen glass 14 of the copying machine 10, and similar effects to those described above can be obtained.

The foregoing description has been made on the copying machine 10 equipped with the magnetic body sensing device 100 which applies an alternate magnetic field to plural magnetic bodies associated with identification information formed on the original document 1, and senses the identification information assigned to the original document 1 based on the detection results of a magnetic pulse generated by magnetization reversal of the magnetic bodies.

A description will now be made on a case where the copying machine 10 is equipped with a magnetic body sensing device 200 which applies an alternate magnetic field to plural magnetic bodies associated with identification information formed on an original document 1, and senses the identification information assigned to the original document 1 based on a detection results of an electromagnetic wave generated by magnetostrictive vibrations of the magnetic bodies.

The construction and operations of the copying machine 10 equipped with the magnetic body sensing device 200 are similar to those of the copying machine 10 described above, except that the magnetic body sensing device 100 is substituted with the magnetic body sensing device 200, and a magnetic body applied to a medium has magnetic property to make magnetostrictive vibrations when the magnetic body sensible by the magnetic sensing device 200 receives a magnetic field. Therefore, a detailed description will be made here, focusing on the configuration of the magnetic body sensing device 200 and the operations of the magnetic body sensing device 200 detecting plural magnetic bodies associated with identification information assigned to medium.

Figure 9:
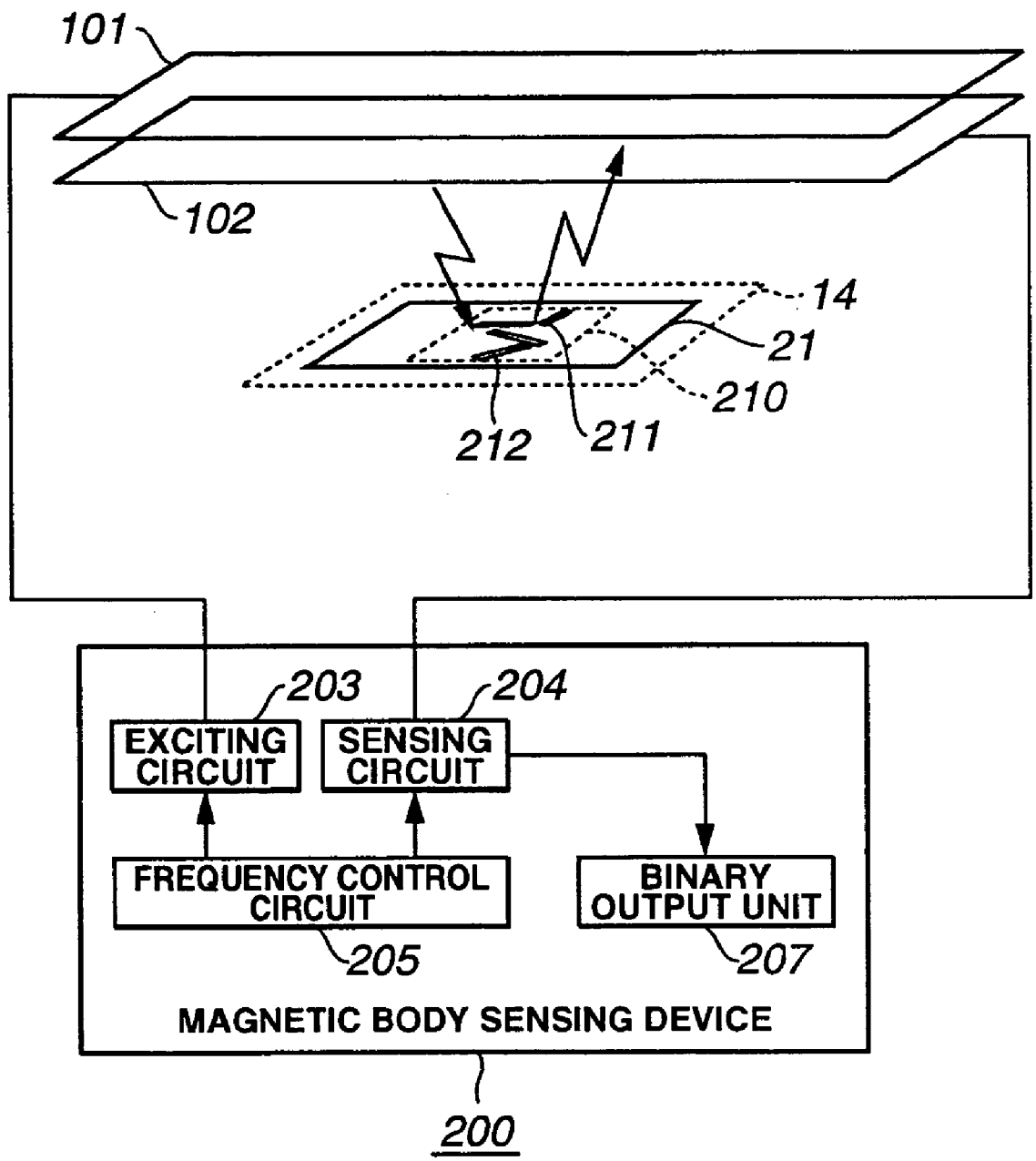
FIG. 9 is a block diagram illustrating configuration of a principal part of a magnetic body sensing device 200 that is constructed differently from the magnetic body sensing device 100.

FIG. 9 is a block diagram illustrating the configuration of a principal part of the magnetic body sensing device 200.

Referring to FIG. 9, the magnetic body sensing device 200 is designed to sense the presence of magnetic bodies provided to an original document 21 by applying a predetermined alternate magnetic field to plural magnetic bodies associated with identification information 210 assigned to the original document 21, and detecting an electromagnetic wave generated by magnetostrictive vibrations of the magnetic bodies.

The alternate magnetic field generated by the exciting coil 101 is designed to repeat the operation of sequentially changing the frequency thereof from a predetermined low frequency to a predetermined high frequency, and from the predetermined low frequency to the predetermined high frequency upon the predetermined high frequency being attained.

Specifically, the magnetic body sensing device 200 includes an exciting circuit 203 for performing control to cause the exciting coil 101 to generate a predetermined alternate magnetic field whose frequency changes sequentially from a low frequency to a high frequency; a sensing circuit 204 for detecting an electromagnetic wave as a voltage signal, by means of the sensing coil 102, the electromagnetic wave being generated when magnetic bodies provided to the original document 21 make magnetostrictive vibrations upon receiving the predetermined alternate magnetic field generated by the exciting coil 101; a binary output unit 207 for outputting, in binary digits, information on the magnetic bodies provided to the original document 21 based on the detection signal detected by the sensing circuit 204; and a frequency control circuit 205 for controlling the frequency of the exciting circuit 203 and the sensing circuit 204.

The frequency control circuit 205 performs, for example, control of bandwidth restriction for the set frequency of a band-pass filter circuit (not shown) of the sensing circuit 205 in accordance with the frequency of the alternate magnetic field generated by the exciting circuit 203.

In the magnetic body sensing device 200 thus configured, the exciting circuit 203 for example applies a voltage to a voltage controlled oscillator (VCO) circuit not shown in the drawings, generates a waveform signal according to the voltage controlled by the voltage controlled oscillator circuit, and performs power amplification on the generated waveform signal to generate an alternate magnetic field which changes its frequency continuously linearly from a low frequency to a high frequency or from a high frequency to a low frequency, by way of the exciting coil 101.

In this embodiment, an alternate magnetic field which changes its frequency continuously linearly from a predetermined low frequency to a predetermined high frequency is generated intermittently.

Specifically, an alternate magnetic field with a predetermined low frequency is generated for a certain period of time, the generation with the low frequency is stopped for a certain period of time, then an alternate magnetic field with a high frequency is generated for a certain period of time, and then the generation with the high frequency is stopped for a certain period of time. This cycle of operations is repeated sequentially until a predetermined high frequency is attained.

When the frequency of the alternate magnetic field has attained the predetermined high frequency, the cycle of operations of generating an alternate magnetic field whose frequency changes continuously linearly from a predetermined low frequency to a predetermined high frequency and stopping of the generation is repeated again.

In this manner, an alternate magnetic field whose frequency changes continuously and linearly from a predetermined low frequency to a predetermined high frequency is generated by the exciting coil 101 intermittently, and the sensing circuit 204 detects, by means of the sensing coil 102, an electromagnetic wave generated by the magnetic bodies provided to the original document 21 making magnetostrictive vibrations upon receiving the alternate magnetic field, and outputs information on whether the original document 21 has a magnetic body by a binary digit of '1' or '0', based on the detection signal.

More specifically, the electromagnetic wave generated by the magnetostrictive vibrations of the magnetic bodies detected by the sensing coil 102 is detected as a received voltage signal, filtered by a band-pass filter circuit or the like (not shown) in the sensing circuit 204, amplified by an amplifier circuit or the like (not shown) and output in binary digits to the binary output unit 207 as a detection signal indicating the presence of the magnetic body in the original document 21.

The binary output unit 207 converts the input detection signal into binary information represented by a value of '1' or '0', and outputs this binary information to the control unit 11 of the copying machine.

The binary output unit 207 outputs binary information of '1' for example if the magnetic bodies provided to the original document 21 are detected, and binary information of '0' for example if no magnetic body is detected.

A description will now be made with reference to FIG. 10 on operations of the magnetic body sensing device 200 thus configured to detect plural magnetic bodies associated with provided identification information assigned to the original document 21.

Figure 10A:
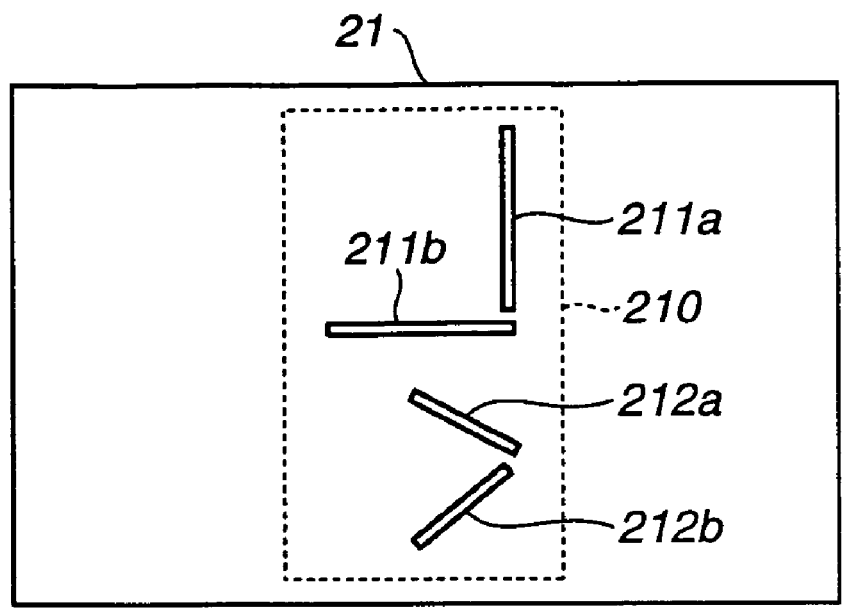
FIG. 10A illustrates an original document 21 provided with plural magnetic bodies associated with identification information 210.
Figure 10B:
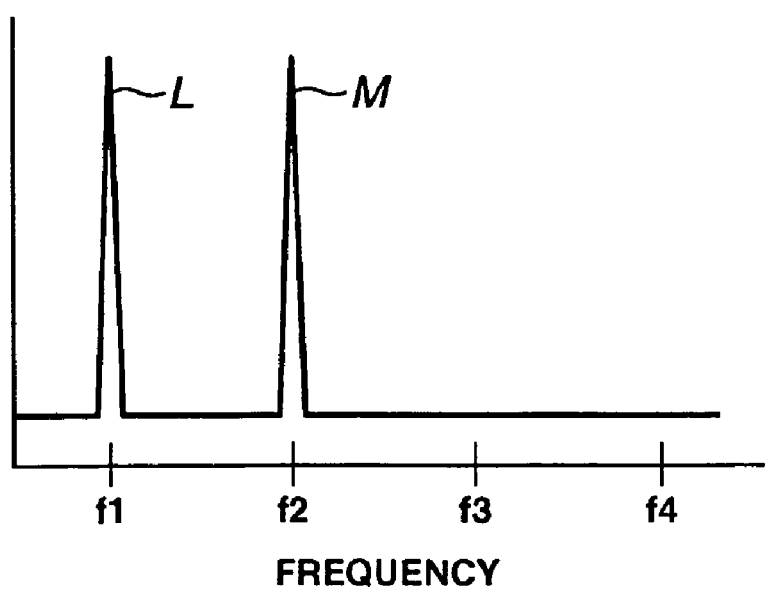
FIG. 10B illustrates an example of the detection signals of the magnetic bodies provided to the original document 21.

FIG. 10A illustrates an original document 21 provided with plural magnetic bodies associated with identification information 210, and FIG. 10B illustrates an example of the detection signals of the magnetic bodies provided to the original document 21, which are detected by the sensing circuit 204 of the magnetic body sensing device 200.

Referring to FIG. 10A, the original document 21 is provided with magnetic bodies 211*a*, 211*b*, 212*a* and 212*b* associated with identification information 210. The magnetic bodies are formed of a narrow foil of a ferrite or amorphous material, and have the magnetostriction property which is a property of causing dimensional change when receiving a magnetic field from the outside.

The magnetic bodies 211a and 211b are arranged to form an L-shape together, and have an equal length and a same resonance frequency (for example of f2). This will be described in detail later.

The magnetic bodies 212a and 212b are arranged to form a V-shape together, and have an equal length and a same resonance frequency (for example of f1). This will be described in detail later.

When a predetermined alternate magnetic field whose frequency changes sequentially from a low frequency to a high frequency or from a high frequency to a low frequency is applied to the magnetic bodies 211a, 211b, 212a, and 212b, these magnetic bodies magnetostrictively vibrate in the greatest amplitude when receiving an alternate magnetic field with a specific frequency.

The frequency of the alternate magnetic field at which each of the magnetic bodies magnetostrictively vibrates in the greatest amplitude depends on its coercive force that corresponds to the size or shape of the magnetic body. These magnetic bodies have respective unique frequencies according to their sizes and shapes (hereafter, referred to as "resonance frequency").

Conversely, as the results of the magnetostrictive vibrations, the magnetic bodies cause a dimensional change, and an electromagnetic wave is generated by the magnetic bodies.

From the foregoing, the presence of the magnetic bodies 211a, 211b, 212a and 212b provided to the original document 21 can be detected by applying an alternate magnetic field according to a resonance frequency unique to the magnetic bodies to cause the magnetic bodies 211a, 211b, 212a and 212b magnetostrictively vibrate, and detecting the electromagnetic wave generated by the magnetic bodies.

Specifically, when the magnetic bodies 211a and 211b, which have a resonance frequency of f2 at which the magnetic bodies 211a and 211b magnetostrictively vibrate in the greatest amplitude upon receiving an alternate magnetic field, receive an alternate magnetic field generated by the exciting coil 101 and whose frequency changes sequentially from a predetermined low frequency to a predetermined high frequency, the magnetic bodies 211a and 211b make magnetostrictive vibrations and generate an electromagnetic wave at the frequency of the alternate magnetic field in the vicinity of f2.

When the magnetic bodies 212a and 212b, which have a resonance frequency of f1 at which the magnetic bodies 212a and 212b magnetostrictively vibrate in the greatest amplitude upon receiving an alternate magnetic field, receive an alternate magnetic field generated by the exciting coil 101 and whose frequency changes sequentially from a predetermined low frequency to a predetermined high frequency, the magnetic bodies 212a and 212b make magnetostrictive vibrations and generate an electromagnetic wave at the frequency of the alternate magnetic field in the vicinity of f1.

The electromagnetic waves generated by the magnetic bodies 211a, 211b, 212a, and 212b are received by the sensing coil 102, and detected by the sensing circuit 204 as detection signals L and M shown in FIG. 10B.

Based on the detection signals L and M detected by the sensing circuit 204, the binary output unit 207 associates information on whether there is a detection signal in the vicinity of the frequency f1 of the alternate magnetic field with a first bit information, and information on whether there is a detection signal in the vicinity of the frequency f2 of the alternate magnetic field with a second bit information. For example, if the detection signals L and M as shown in FIG. 10B are detected from the original document 21, the binary output unit 207 sets, based on these detection signals, the first bit information to '1' indicating that there is a detection signal in the vicinity the frequency f1 of the alternate magnetic field, and sets the second bit information as '1' indicating that there is a detection signal in the vicinity of the frequency f2 of the alternate magnetic field. Thus, the binary output unit 207 associates the information on the presence of the detection signals with the information of '11', and outputs the identification information 210 assigned to the original document 21 as the binary information of '11'.

The magnetic body sensing device 200 generates intermittently an alternate magnetic field whose frequency changes continuously linearly from a predetermined low frequency to a predetermined high frequency by means of the exciting coil 101, and receives through the exciting coil 102 the electromagnetic waves, which are generated by the magnetostrictive vibrations of the magnetic bodies 211a, 211b, 212a and 212b in a predetermined period of time during which the generation of the alternate magnetic field is suspended. Therefore, the configuration may be adopted in which the exciting coil 101 also serves to perform the function of the sensing coil 102.

As described above, a magnetic body that generates a signal when a magnetic field is applied thereto is provided to a medium in association with identification information of the medium, and the magnetic body has at least two or more easy magnetization directions. Consequently, it is possible to reduce the erroneous detection of the magnetic body caused by a direction along which the magnetic body sensing device senses the medium, and to improve the accuracy of detecting information that identifies the medium.

What is claimed is:

1. A medium comprising:
   a magnetic body that generates a signal when an alternating magnetic field is applied thereto, wherein
   the magnetic body has two or more non-parallel directional axes in which the magnetic body is easy to cause magnetization reversion, wherein each directional axis is with respect to a direction from which the alternating magnetic field is applied;
   the magnetic body forms information that identifies the medium based on the signal generated when the alternating magnetic field is applied; and
   the alternating magnetic field has a frequency that changes sequentially from a low frequency to a high frequency.

2. The medium according to claim 1, wherein the magnetic body is shaped into a shape having at least two easy magnetization axes.

3. The medium according to claim 2, wherein an angle defined by at least two of the easy magnetization axes of the magnetic body is in the range of 45 degrees to 135 degrees.

4. The medium according to claim 1, wherein the magnetic body is reversed in magnetization when the alternating magnetic field is applied to the magnetic body, and generates a magnetic pulse signal when the magnetization is reversed.

5. The medium according to claim 1, wherein the magnetic body makes magnetostrictive vibrations when the magnetic field is applied to the magnetic body, and generates an electromagnetic wave signal during the magnetostrictive vibrations.

6. The medium according to claim 1 wherein the magnetic body is in a wire shape.

7. The medium according to claim 1 wherein the magnetic body is in a flake shape.

8. The medium according to claim 1 wherein the magnetic body is in a circular shape.

9. The medium according to claim 1 wherein the magnetic body is in an L-shape.

10. The medium according to claim 1 wherein the magnetic body is in a V-shape.

11. The medium according to claim 1 wherein the magnetic body is in a U-shape.

12. A magnetic body sensing device for sensing a medium provided with a magnetic body that generates a signal when an alternating magnetic field is applied thereto, comprising:
   a coil that applies an alternating magnetic field to the magnetic body provided to the medium,
   a detector that detects a signal generated by the magnetic body in response to the alternating magnetic field applied; and
   a sensor that senses information formed by the magnetic body based on the signal generated by the magnetic body and detected by the detector,
   wherein the magnetic body has two or more non-parallel directional axes in which the magnetic body is easy to cause magnetization reversion, and each directional axis is with respect to a direction from which the alternating magnetic field is applied, and
   the alternating magnetic field has a frequency that changes sequentially from a low frequency to a high frequency.

13. The medium according to claim 1 wherein the magnetic body forms the information that identifies the medium based on the signal, which is generated by the magnetization reversion of the two or more easy magnetization directions in response to the direction of the alternating magnetic field that is applied.

14. The magnetic body sensing device according to claim 12 wherein the sensor senses the information formed by the magnetic body based on the signal, which is generated by the magnetization reversion of the two or more easy magnetization directions in response to the direction of the alternating magnetic field that is applied by the detector.

15. The medium according to claim 1, wherein the magnetic body has three easy magnetization directions.

16. The magnetic body sensing device according to claim 12, wherein the magnetic body has three easy magnetization directions.

17. The medium according to claim 1, wherein the continuous magnetic element is a magnetic wire.

18. The magnetic body sensing device according to claim 12, wherein the magnetic element is a magnetic wire.

19. The medium according to claim 1, wherein the magnetic element is a continuous magnetic element.

20. The magnetic body sensing device according to claim 12, wherein the magnetic element is a continuous magnetic element.

21. A medium comprising:
   a magnetic body that generates a signal when an alternating magnetic field is applied thereto, wherein
   the magnetic body has two or more non-parallel easy magnetization directions along a magnetic element for causing magnetic reversion to the magnetic body;
   the magnetic body forms information that identifies the medium based on the signal generated when the alternating magnetic field is applied; and
   the alternating magnetic field has a frequency that changes sequentially from a low frequency to a high frequency.

* * * * *